(12) United States Patent
Kawashima et al.

(10) Patent No.: US 7,973,498 B2
(45) Date of Patent: Jul. 5, 2011

(54) ILLUMINATION CONTROL SYSTEM

(75) Inventors: Toshikazu Kawashima, Osaka (JP); Junichi Katou, Osaka (JP); Atsuo Nanahara, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 330 days.

(21) Appl. No.: 12/379,555

(22) Filed: Feb. 25, 2009

(65) Prior Publication Data

US 2009/0212718 A1 Aug. 27, 2009

(30) Foreign Application Priority Data

Feb. 26, 2008 (JP) ................................. 2008-044448

(51) Int. Cl.
*H05B 37/00* (2006.01)
(52) U.S. Cl. ........ 315/318; 315/312; 315/308; 315/297; 315/155; 315/152
(58) Field of Classification Search .................. 315/149, 315/152, 155, 294, 297, 301, 308, 312, 318, 315/360, 361
See application file for complete search history.

(56) References Cited

U.S. PATENT DOCUMENTS

| | | | | |
|---|---|---|---|---|
| 7,253,942 B2 * | 8/2007 | Belliveau | ...................... | 359/292 |
| 7,449,847 B2 * | 11/2008 | Schanberger et al. | ........ | 315/312 |
| 7,729,941 B2 * | 6/2010 | Zampini et al. | .............. | 705/14.4 |
| 7,825,602 B2 * | 11/2010 | Hu et al. | ....................... | 315/152 |
| 2008/0265799 A1 * | 10/2008 | Sibert | ........................... | 315/292 |

* cited by examiner

*Primary Examiner* — Haissa Philogene
(74) *Attorney, Agent, or Firm* — Bacon & Thomas, PLLC

(57) ABSTRACT

An illumination control system includes lighting apparatuses connected to a communications line and a number of functional units of plural kinds functioning to detect information from ambient environments of the lighting apparatuses. Each lighting apparatus includes a lamp, an illumination circuit, a communication unit, a control unit, and a unit attaching part to which the functional unit is detachably attached. Each lighting apparatus belongs to one or more of plural groups corresponding to the functional units, the groups being operated based on information detected by the respective functional units. A functional unit having a detecting function corresponding to an operation of each group is attached to each unit attaching part of at least one lighting apparatus of each group, and each communication unit of the at least one lighting apparatus sends the control signal including information detected by the corresponding functional unit to another lighting apparatus in the same group.

4 Claims, 8 Drawing Sheets

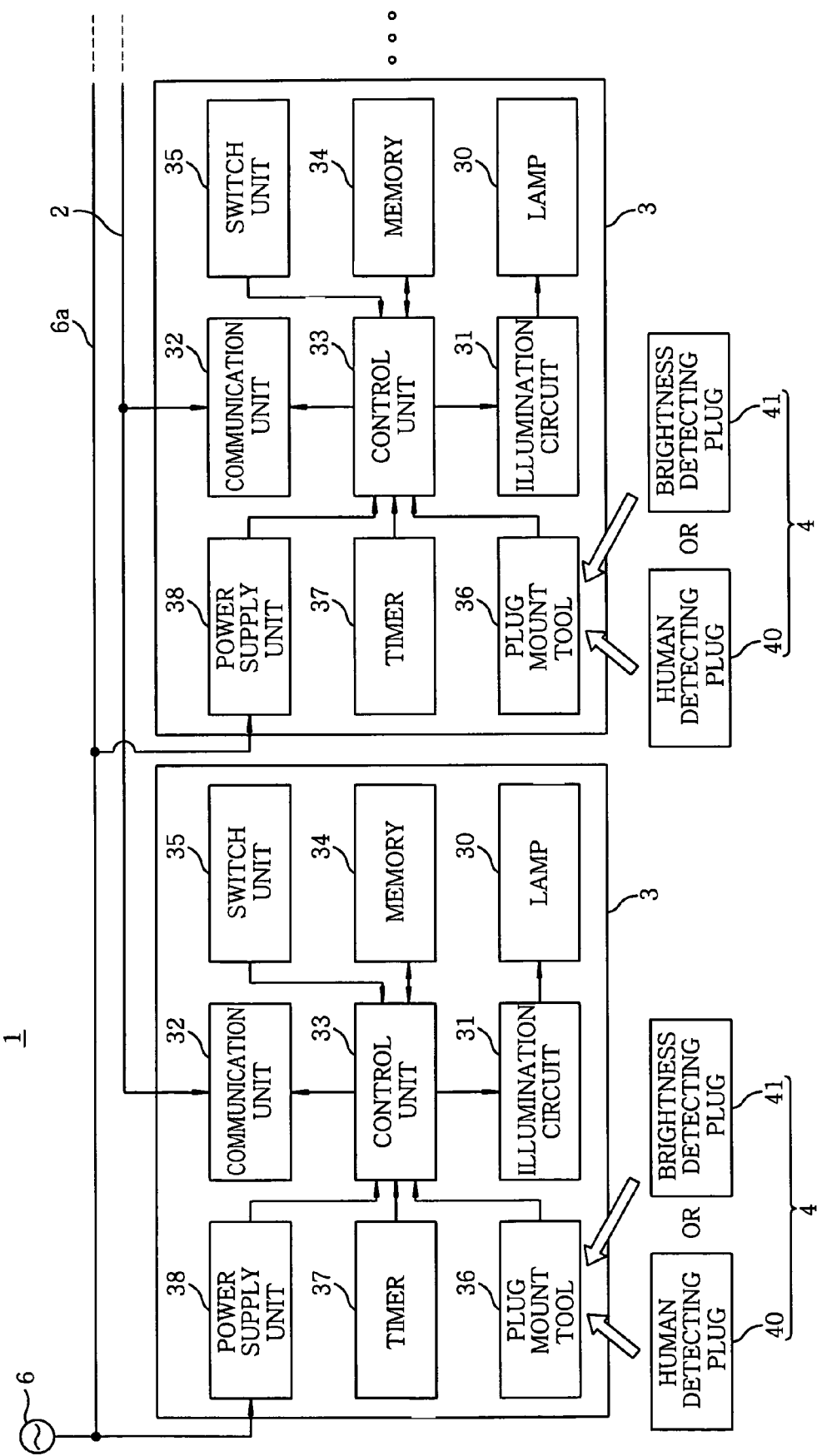

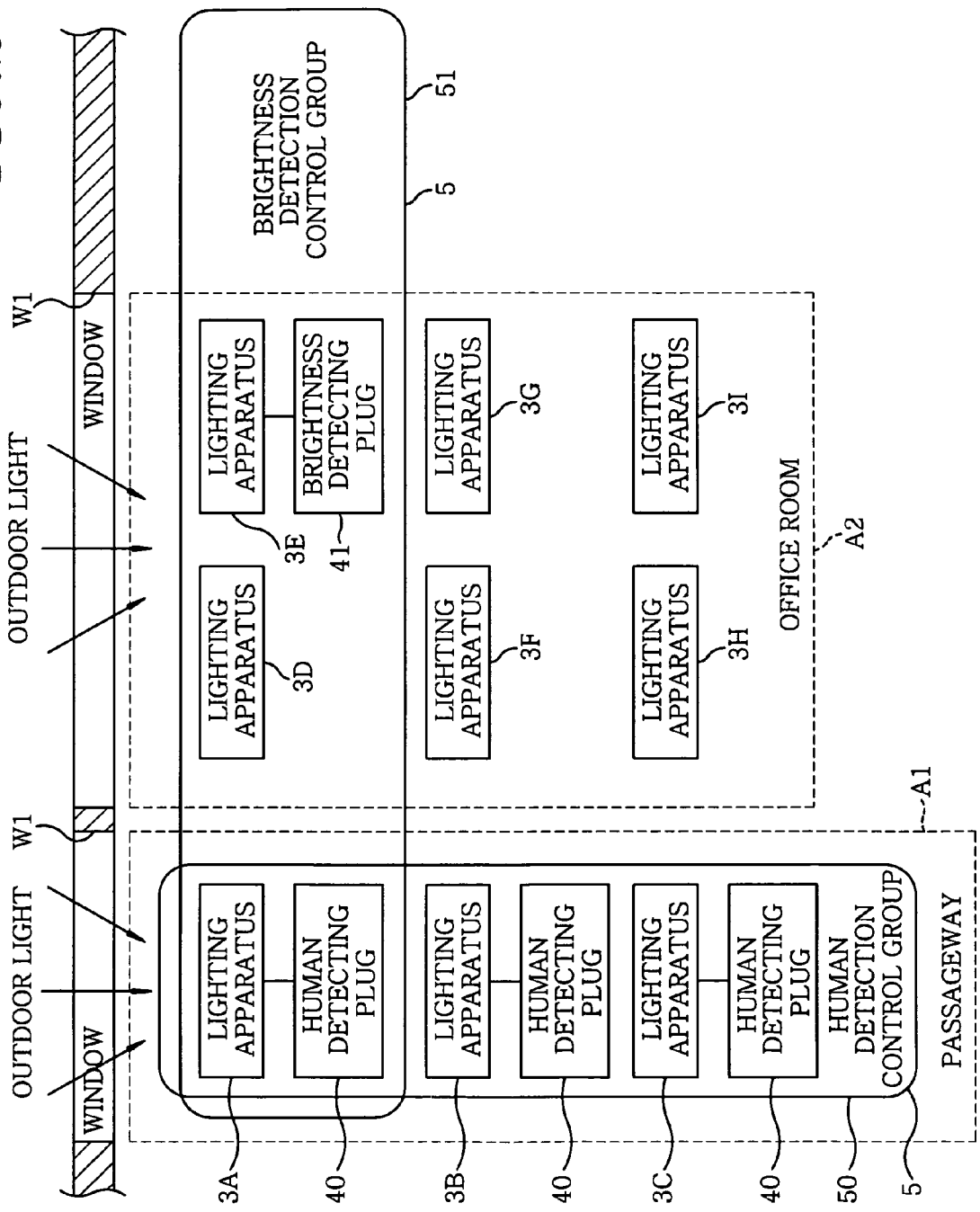

ILLUMINATION CONTROL SYSTEM

FIELD OF THE INVENTION

The present invention relates to an illumination control system that controls illumination of lighting apparatuses provided in the system.

BACKGROUND OF THE INVENTION

Conventionally, there is known an illumination control system that includes a plurality of lighting apparatuses, an illuminance detecting unit for detecting illuminance on surroundings provided by the lighting apparatuses, and a control unit for turn-on control of the lighting apparatuses based on data inputted from the illuminance detecting unit at regular intervals (see, e.g., Japanese Patent Laid-open Application No. H8-250285). In such illumination control systems, the control unit controls the turn-on state of the lighting apparatuses such that the average illuminance on a surface illuminated is kept almost constant regardless of time.

However, in the conventional technique described in the Japanese Patent Laid-open Application No. H8-250285, the lighting apparatuses are controlled by only one specific kind of detection information detected by the illuminance detecting unit. Further, in the Japanese Patent Laid-open Application No. H8-250285, no information about whether to control the lighting apparatuses individually or collectively is disclosed, and it is not possible to set only a part of the lighting apparatuses as a target to be controlled. As such, it is difficult to have a degree of freedom related to system setup.

SUMMARY OF THE INVENTION

In view of the above, the present invention provides an illumination control system, capable of controlling lighting apparatuses based on various kinds of detection information relative to ambient environments of the lighting apparatuses, performing the illumination control so as to be more suitable for the ambient environments of the lighting apparatuses in comparison with conventional illumination control performed based on only one kind of detection information, and increasing a degree of freedom related to system setup.

In accordance with an embodiment of the present invention, there is provided an illumination control system including a plurality of lighting apparatuses connected to a communications line; a number of functional units of plural kinds which function to detect information from ambient environments of the lighting apparatuses, wherein each lighting apparatus includes: a lamp; an illumination circuit for continuously or stepwisely changing a luminous flux of the lamp; a communication unit for sending or receiving a control signal including an operation instruction or a parameter to and from another lighting apparatus through the communications line; a control unit for controlling the illumination circuit based on the control signal and performing illumination control of the lamp; and a unit attaching part, wherein the functional units are detachably attached to the unit attaching parts of the lighting apparatus.

Herein, each lighting apparatus belongs to one or more of plural groups corresponding to the plural kinds of the functional units, the groups being operated based on information detected by the functional units. Further, a functional unit having a detecting function corresponding to an operation of each group is attached to each unit attaching part of at least one lighting apparatus of each group, and each communication unit of the at least one lighting apparatus sends the control signal including information detected by the corresponding functional unit to another lighting apparatus in the same group.

In such configuration, each lighting apparatus includes a unit attaching part to which one of functional units of various kinds for detecting a change in an ambient environment thereof can be attached, and by attaching the functional units to the unit attaching parts, the lighting apparatuses can be controlled based on various kinds of detection information. Therefore, in comparison with conventional illumination control carried out based on only one specific kind of detection information, the illumination control in accordance with the embodiment of the present invention can be carried out in a manner more suitable for the ambient environments of the lighting apparatuses. Further, each lighting apparatus can be set to belong to one or more of the plural groups corresponding to the plural kinds of the functional units, each group being operated based on information detected by a corresponding functional unit, so that the degree of freedom related to system setup can be increased.

The plural groups may include a human detection control group having a lighting apparatus to which a human detecting sensor is attached as a functional unit; and a brightness detection control group having a lighting apparatus to which a brightness sensor is attached as a functional unit, wherein one or more of lighting apparatuses may be set to belong to both the human and the brightness detection control group.

Herein, each of at least one of the one or more lighting apparatuses belonging to both the human and the brightness detection control group may have a brightness sensor attached thereto, and may store a plurality of target values of luminous flux, which correspond to illumination levels to be changed by human detection control and are to be detected by the corresponding brightness sensor, so that the target values can be switched over according to illumination level control operation of the human detection control group.

In such configuration, a lighting apparatus having a brightness sensor can be set to belong to both of the human and the brightness detection control group. When the illumination level is changed by the human detection control, the brightness around the lighting apparatus varies, and the brightness sensor detects the changed brightness. The lighting apparatus is controlled based on the detected brightness information. Further, the lighting apparatus stores the plurality of target values of the luminous flux to be detected by the brightness sensor, the target values corresponding to the aforementioned illumination levels, and the target values can be switched over according to the illumination level control operation of the human detection control group.

For this reason, when the lighting apparatus carries out the feed-back control on the lamp thereof based on the detected brightness information, errors can be prevented from occurring due to a variation in the brightness caused by the illumination level changed of the human detection control. Thus, precise lamp control can be made in the brightness detection control group.

Each lighting apparatus of the embodiment may include a timer which counts an accumulative turn-on time of the lamp, and the control unit of each lighting apparatus may perform the illumination control of the lamp based on the accumulative turn-on time of the lamp to maintain the luminous flux at a predetermined value independent of luminous flux reduction due to a characteristic of the lamp with a lapse of time.

The timer of each lighting apparatus can count the accumulative turn-on time of the lamp and the accumulative turn-on time of the lamp can be reset to zero when the lamp is replaced. Therefore, the accumulative turn-on time of the lamp can be accurately counted for each lighting apparatus. Thus, based on the accurately counted accumulative turn-on time, the luminous flux can be maintained to be kept at a constant value despite of reduction of the luminous flux due to a characteristic of the lamp with the lapse of time, so that the luminous flux of the lamp can be adjusted to be maintained at a desired value with high precision.

BRIEF DESCRIPTION OF THE DRAWINGS

The object and features of the present invention will become apparent from the following description of embodiments given in conjunction with the accompanying drawings, in which:

FIG. 1A shows a configuration of an illumination control system in accordance with a first embodiment of the present invention.

FIG. 2 is a top plan view showing an arrangement example of lighting apparatuses divided into groups in the illumination control system in accordance with the first embodiment of the present invention;

DETAILED DESCRIPTION OF THE EMBODIMENTS

Hereinafter, an illumination control system in accordance with embodiments of the present invention will be described with reference to accompanying drawings which form a part hereof.

First Embodiment

Figure 1B:
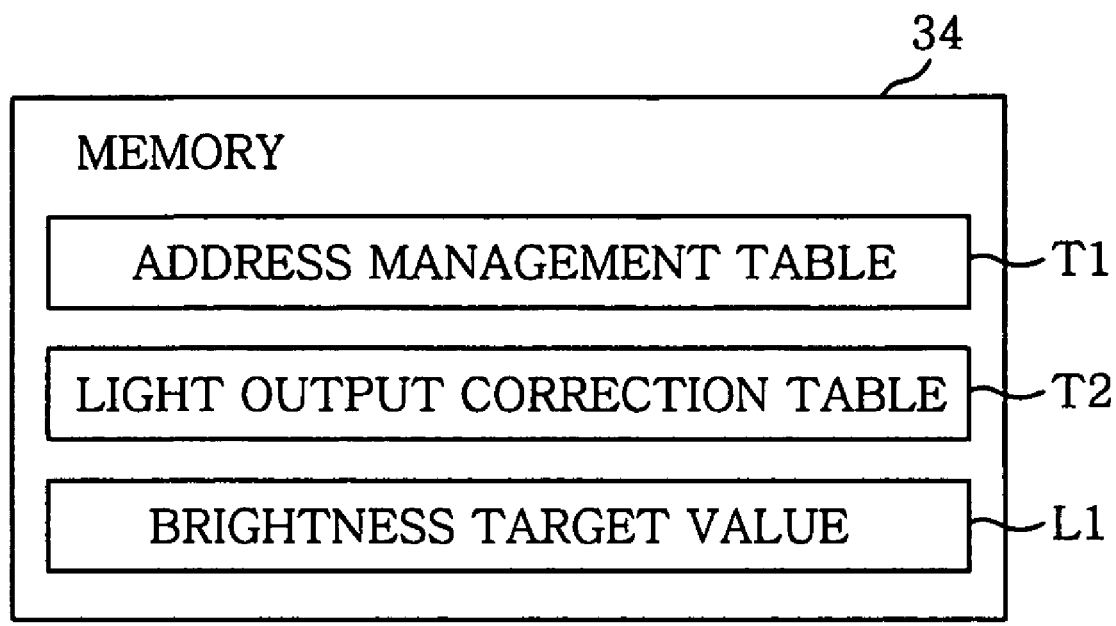
FIG. 1B shows various data stored in a memory of each lighting apparatus of the illumination control system.

FIGS. 1A and 1B show configurations of the illumination control system in accordance with a first embodiment of the present invention and various data stored in the memories of lighting apparatuses of the illumination control system. The illumination control system 1 includes a plurality of lighting apparatuses 3 each connected to a communications line 2, and a number of functional plugs (functional units) 4 of plural kinds which function to detect information from ambient environments of the lighting apparatuses 3 and detachably attached to the lighting apparatuses 3. The respective lighting apparatuses 3 are operated based on various kinds of information detected by the functional plugs 4. A functional plug 4 includes a human detecting plug 40 which functions to detect a human being or a brightness detecting plug 41 which functions to detect brightness.

As shown in FIG. 2, the lighting apparatuses 3 (3A to 3E) each belongs to one or more of the plural groups corresponding to the plural kinds of the functional plugs 4, the groups being operated based on information detected by the respective functional plugs 4. These groups 5 include a human detection control group 50 for performing illumination control based on detection of the human being, and a brightness detection control group 51 for performing illumination control based on detection of ambient brightness. A functional plug 4 having a detecting function corresponding to an operation of each group 5 is attached to each of at least one lighting apparatus 3 of each group 5. For example, the human detecting plug 40 is attached to each of at least one lighting apparatus 3 in the human detection control group 50, and the brightness detecting plug 41 is attached to each of at least one lighting apparatus 3 in the brightness detection control group 51.

A lighting apparatus 3 to which the functional plug 4 is attached is operated based on the information detected by the attached functional plug 4, and send the detected information to the remaining lighting apparatus(es) in the same group 5 relating to the corresponding functional plug 4. That is, the human detection information detected by the human detecting plug 40 of the lighting apparatus 3A belonging to both the human and the brightness detection control group 50 and 51 is preferably sent only to the lighting apparatuses 3B and 3C in the human detection control group 50 (not to the lighting apparatuses 3D and 3E in the brightness detection control group 51) since the human detecting plug 40 is only related the human detection control of the human detection control group 50.

Further, there can be lighting apparatuses 3, e.g., the lighting apparatuses 3F to 3I shown in FIG. 2, which do not belong to any one of the groups 5.

As shown in FIG. 1 above, each lighting apparatus 3 includes a lamp 30, an illumination circuit 31 for continuously or stepwisely changing a luminous flux of the lamp 30, a communication unit (communication means) 32 for sending or receiving a control signal including an operation instruction or a parameter to and from another lighting apparatus 3 through a communications line 2, a control unit (control means) 33 for controlling the illumination circuit 31 based on the control signal and performing turning-on, turning-off or illumination level control (hereinafter, referred to as "illumination control") of the lamp 30, a memory 34 which stores various data, and a switch unit 35 manipulated by a user to set an address of the lighting apparatus 3. The memory 34 stores an operation program of the control unit 33, and an address management table T1 providing correspondence between pre-registered addresses and the groups 5. That is, in the address management table T1, one or more addresses for each group 5 are registered, and an additional address for a case of belonging to plural groups 5 is also registered. One of these addresses is assigned to a lighting apparatus 3 by the switch unit 35, so that the lighting apparatus 3 is set to a group 5 corresponding to the address.

Further, the lighting apparatus 3 includes a plug mount tool (unit attaching part) 36 to which the functional plug 4 is detachably attached, a timer 37 for counting an accumulative turn-on time of the lamp 30, and a power supply unit 38 having such as an AC/DC converter and the like that is connected to a commercial AC power source 6 through a power supply line 6a and converts an AC power from the AC power source into a DC power, thereby supplying the DC power to respective units in the lighting apparatus 3.

The lamp 30 may be a light emitting diode (LED), a fluorescent lamp, a high-intensity discharge lamp, or an electric bulb, but is not limited thereto. The communication unit 32 includes a two-wire serial communications circuit based on RS 485, and uses a serial communications cable as the communications line 2.

The control unit 33 includes, e.g., a microprocessor and the like. If driving current of the lamp 30 is a pulse width modulation (PWM) signal, the illumination control of the lamp 30 by the control unit 33 is performed by controlling its duty ratio. Further, if the illumination circuit 31 is configured by an inverter circuit, the illumination control is performed by controlling voltage applied to the lamp 30. In addition, if there are a number of lamps 30, the illumination control is performed by increasing or decreasing the number of lamps 30 switched on.

Further, if the functional plug 4 is attached on the plug mount tool 36 of the lighting apparatus 3, the control unit 33 refers to the address management table T1 in the memory 34 when the functional plug 4 detects information from the ambient environment of the lighting apparatus 3. If an address of another lighting apparatus 3 belonging to the same group 5 exists, the address is set as a destination so that the control unit 33 sends a control signal from the communication unit 32 to the another lighting apparatus 3 corresponding thereto. The control signal includes address information of the destination, information detected by the functional plug 4, or operations based on the detected information. The communication unit 32 of the lighting apparatus 3 having an address identical to that of the control signal receives the control signal. Therefore, the control signal can be transceived among lighting apparatuses in the same group 5.

Lighting apparatuses in a same group 5 operate in a manner coupled to each other. Specifically, in the brightness detection control group 51 of the present embodiment, a control unit 33 of a lighting apparatus 3 without a functional plug 4 performs the illumination control of a lamp 30 thereof based on the received control signal. Further, a control unit 33 of a lighting apparatus 3 to which a functional plug 4 is attached performs the illumination control of a lamp 30 thereof based on information detected by the functional plug 4 attached thereto. In the human detection control group 50, however, the lighting apparatuses 3 are all turned on if any one of the lighting apparatuses 3 detects the presence of human being.

Figure 3:
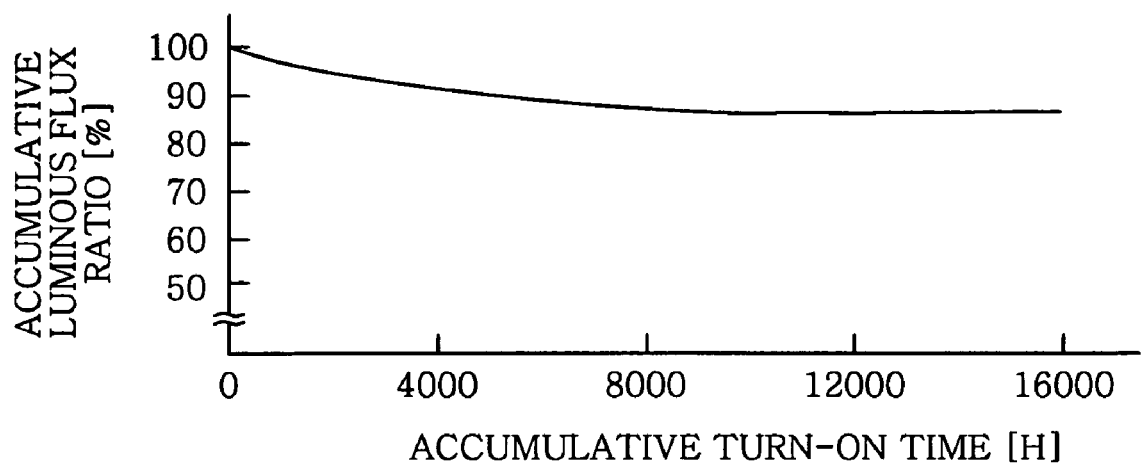
FIG. 3 depicts a relationship between a luminous flux ratio and an accumulative turn-on time in an ordinary lamp.

However, as shown in FIG. 3 and Table 1, although a light source continues to be turned on with an almost same amount of current capable of obtaining a maximum output, an accumulative luminous flux ratio is reduced in proportion to an accumulative turn-on time with the lapse of time. Here, the luminous flux ratio refers to a ratio of a maximum with the lapse of time to the initial maximum luminous flux.

TABLE 1

| | Accumulative turn-on time (h) | | | | |
|---|---|---|---|---|---|
| | 0 | 4000 | 8000 | 12000 | 16000 |
| Accumulative Luminous Flux Ratio (%) | 100 | 91 | 87 | 86 | 85.5 |

Figure 4:
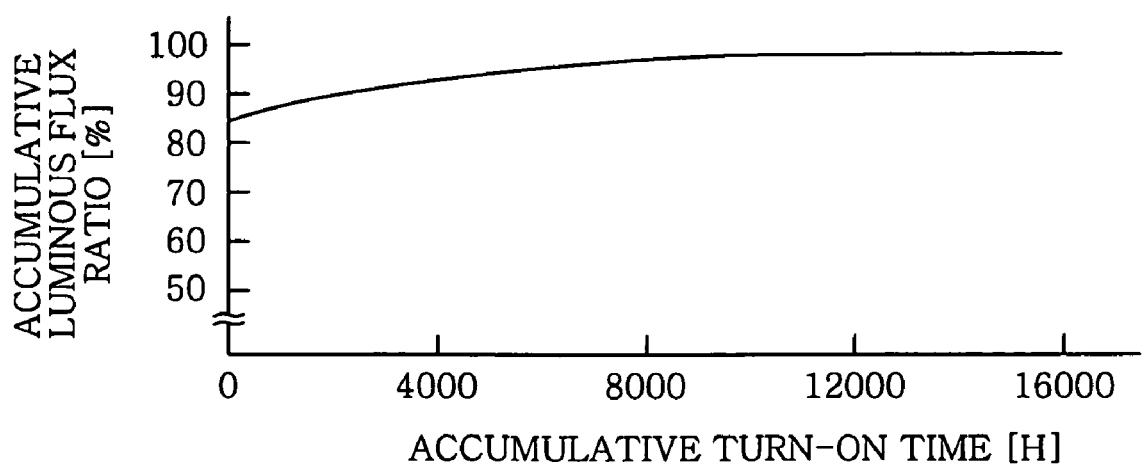
FIG. 4 depicts a relationship between an accumulative illumination rate and an accumulative turn-on time of a lamp controlled by a control unit of the illumination control system.

The memory 34 stores a light output correction table T2 providing correspondence between the accumulative turn-on time of the lamp 30 and an accumulative illumination rate of the lamp 30 in order to maintain the luminous flux at a predetermined value despite reduction in the aforementioned luminous flux ratio. Here, the accumulative illumination rate refers to ratio of a light output to a maximum light output at each point of time. As shown in FIG. 4 and Table 2, from an initial stage to a rated lifespan, the light output correction table T2 includes control data in which the accumulative illumination rate is set to be lower than 100% at the initial stage, to be gradually increased in proportion to the accumulative turn-on time, and to reach about 100% at the rated lifespan in order to make the maximum light output at any time be almost identical to the maximum light output at the rated lifespan (hereinafter, this correction is referred to as "initial illuminance correction").

TABLE 2

| | Accumulative turn-on time (h) | | | | |
|---|---|---|---|---|---|
| | 0 | 4000 | 8000 | 12000 | 16000 |
| Accumulative illumination Rate (%) | 85 | 92.65 | 96.05 | 96.9 | 97.75 |

Moreover, the brightness which can be obtained when the lamp 30 is turned on at the accumulative illumination rates produced by the initial illuminance correction in an environment where almost all external light is shaded is pre-stored as a brightness (illuminance) target value L1 in the memory 34. In the brightness detection control group 51, the lamp 30 is feed-back controlled such that the brightness caused by the illumination light of the lamp 30 and the external light is matched with the brightness target valve L1. The memory 34 can be implemented as a read only memory (ROM), a random access memory (RAM), an electrically erasable programmable ROM (EEPROM), or the like. The switch unit 35 can be implemented as, for instance, a dual in-line package (DIP) switch.

Figure 5A:
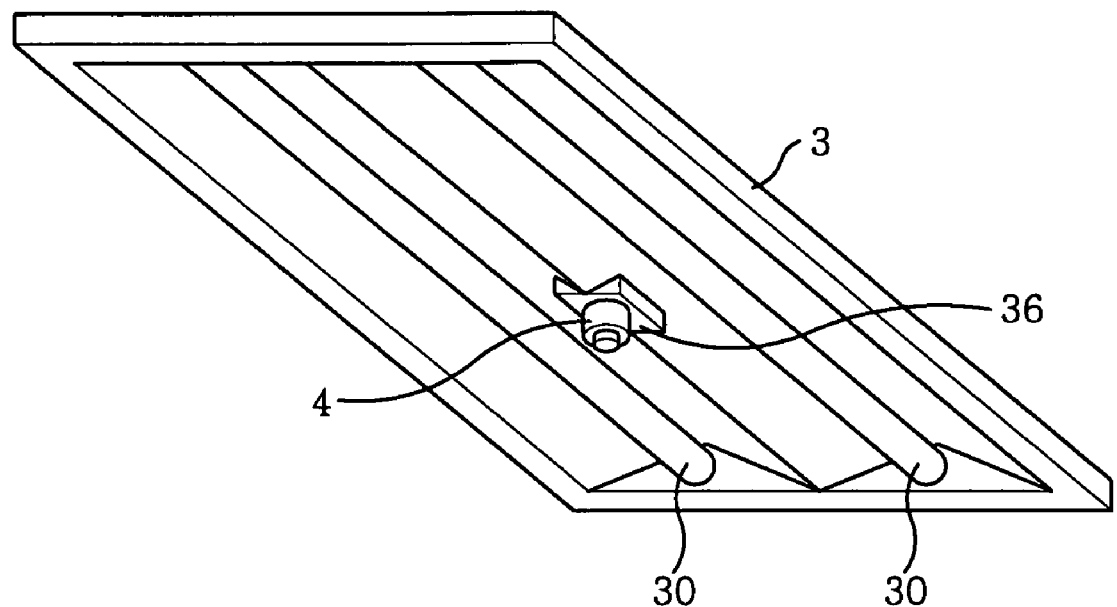
FIG. 5A is a perspective view showing a lighting apparatus and functional plug when viewed from the bottom.
Figure 5B:
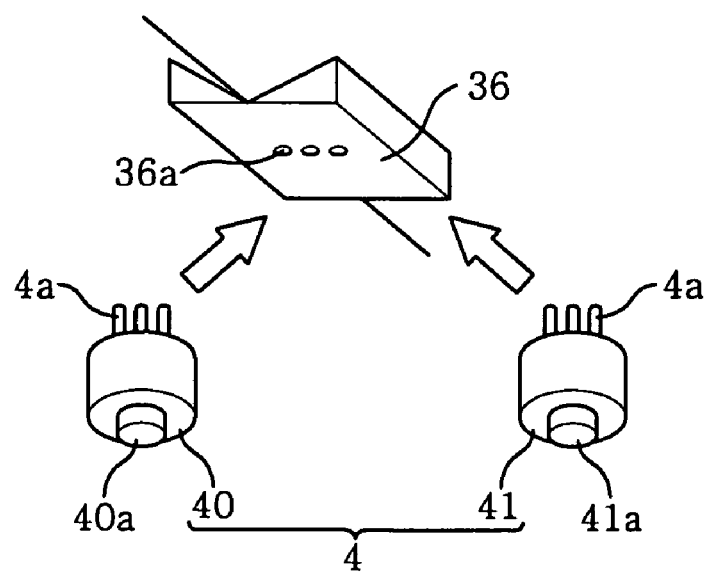
FIG. 5B is an enlarged perspective view of FIG. 5A.

As shown in FIG. 5A, the plug mount tool 36 is installed around the lamp 30 to enable the functional plug 4 to be disposed at a position where change of the ambient environment in a direction of a light irradiated by the lamp 30 can be detected. Further, as shown in FIG. 5B, the plug mount tool 36 has a female connection terminal 36a into which a male connection terminal 4a of the functional plug 4 is fitted, and allows various functional plugs 4, e.g., the human detecting plug 40 and the brightness detecting plug 41, to be alternatively mounted.

The human detecting plug 40 includes a human detecting sensor 40a such as a passive infrared ray (PIR) sensor including a focusing element and the like, and the brightness detecting plug 41 includes a brightness sensor 41a such as a photodiode and the like. Detailed configurations of the plug mount tool 36 and the functional plug 4 have almost same as those of a functional extension terminal and a functional plug described in Japanese Patent Laid-open Application No. 2002-110376. Count of the accumulative turn-on time by the timer 37 is performed by counting, e.g., a time during which drive current or lamp current flows to the lamp 30.

Next, the illumination control of the lamp 30 performed by the control unit 33 of the lighting apparatus 3 of the illumination control system 1 will be described with reference to FIGS. 1 and 2. As for one example, it is assumed that the lighting apparatuses 3A to 3C having the same configuration as the lighting apparatus 3 are installed on the ceiling of a passageway A1 while the lighting apparatuses 3D to 3I are installed on the ceiling of an office room A2, and the lighting apparatuses 3A, 3D and 3E are installed aside a window W1.

Further, it is assumed that the lighting apparatus 3A is set to belong to both of the human detection control group 50 and the brightness detection control group 51 while the lighting apparatuses 3B and 3C are set only to belong to the human detection control group 50, and the lighting apparatuses 3D and 3E are set only to belong to the brightness detection control group 51. In addition, it is assumed that the human detecting plugs 40 are attached to the lighting apparatuses 3A to 3C while the brightness detecting plug 41 is attached to the lighting apparatus 3E. Also, it is assumed that the lighting apparatuses 3F to 3I do not belong to any group 5. Here, only the operation of the lighting apparatuses 3A to 3E will be described.

In each lighting apparatus 3, the control unit 33 controls the illumination rate of the corresponding lamp 30 based on the accumulative illumination rate of the light output correction table T2 stored in the corresponding memory 34.

The Control units 33 of the lighting apparatuses 3B and 3C belonging to the human detection control group 50 control illumination rates of the respective lamps 30 based on the accumulative turn-on times counted by the respective timers 37 and human detection information detected by the human detecting plugs 40 of the lighting apparatuses 3A to 3C. That is, if any one of the human detecting plugs 40 of the lighting apparatuses 3A to 3C detects the presence of human being, all the lamps 30 of the lighting apparatuses 3B and 3C are controlled to be turned on. If otherwise, these lamps 30 are turned off. In detail, in order to control the illumination rate of the lamp 30 of each of the lighting apparatuses 3B and 3C, the accumulative illumination rate corresponding to the accumulative turn-on time of the corresponding lighting apparatus, and an illumination rate based on the detection information of human being (hereinafter, referred to as "human detection illumination rate") are controlled with reference to the light output correction table T2 stored in the memory 34 of the corresponding lighting apparatus. For example, when the accumulative illumination rate of the lighting apparatus 3B (or 3C) is 85%, the human detection illumination rate is set to 100% when a human being is detected by any one of the lighting apparatuses 3A to 3C, and the human detection illumination rate is set to 0% when a human being is not detected by any one of the lighting apparatuses 3A to 3C, a real illumination rate of the lamp 30 of the lighting apparatus 3B (or 3C) is set to 85% (=0.85×1×100) when a human being is detected, and 0% (=0.85×0×100) to turn off the corresponding lamp 30 when a human being is not detected.

The control units 33 of the lighting apparatuses 3D and 3E belonging to the brightness detection control group 51 control illumination rates of the respective lamps 30 based on the accumulative turn-on times counted by the respective timer 37 and the detection output of the brightness detecting plug 41 of the lighting apparatus 3E. In detail, with reference to the light output correction table T2 and the brightness target value L1 stored in the memory 34 of each of the lighting apparatuses 3D and 3E, the illumination rate of the lamp 30 is controlled to make the brightness around each of the lighting apparatuses 3D and 3E to be the brightness target value L1 based on the detection output of the brightness detecting plug 41 of the lighting apparatus 3E, wherein the accumulative illumination rate corresponding to the accumulative turn-on time from the light output correction table T2 is set as an upper limit. As the brightness around each of the lighting apparatuses 3D and 3E increases due to an increase in amount of the external light, i.e. as the detection output of the brightness detecting plug 41 of the lighting apparatus 3E increase, the illumination rates of the lamps 30 of the lighting apparatuses 3D and 3E are set to become low.

Further, as the brightness decreases due to a decrease in the amount of the external light, the illumination rates are set to become high. Therefore, despite the amount of the external light, the brightness is secured to have the brightness target value L1 around the lighting apparatuses 3. The illumination rates of the lamps 30 may be controlled step by step or continuously.

The control unit 33 of the lighting apparatus 3A belonging to both of the human and the brightness detection control group 50 and 51 controls the illumination rate of the lamp 30 based on the accumulative turn-on time counted by the timer 37, the human detection information from the human detecting plug 40 of the lighting apparatuses 3A to 3C and the detection output of the brightness detecting plug 41 of the lighting apparatus 3E. In detail, an illumination rate control provided by combining the illumination rate control of the lighting apparatuses 3B and 3C with that of the lighting apparatuses 3D and 3E is performed in the lighting apparatus 3A. When a human being is detected by any one of lighting apparatuses in the human detection control group 50, the illumination rate control of the lighting apparatus 3A is performed in the same manner as in the illumination rate control of the lighting apparatuses 3D and 3E. In contrast, when no human being is detected by any of the lighting apparatuses 3A to 3C, the illumination rate becomes 0%.

In the present embodiment, each lighting apparatus 3 is provided with the plug mount tool 36, to which one of functional plugs 4 of various kinds for detecting information from an ambient environment of the lighting apparatus 3 is attached, and by attaching the functional plugs 4 to the respective plug mount tools 36, the lighting apparatuses 3 can be controlled based on the various kinds of detection information. Thus, in comparison with the conventional illumination control carried out based on one specific kind of detection information, the illumination control in accordance with the present embodiment can be carried out in a manner more suitable to the ambient environments of the lighting apparatuses 3. Further, each lighting apparatus 3 can be set to belong to one or more of the groups 5 corresponding to the plural kinds of the functional plugs 4, each group 5 being operated based on information detected by a corresponding functional plug 4. For that reason, a degree of freedom related to system setup can be increased.

Further, a functional plug 4 can be attached to any lighting apparatus 3 of each group 5 having operations based on detection information thereof, so that the system is easily built. Also, when a functional plug 4 is attached to one lighting apparatus 3 of each groups, information detected by the corresponding functional plug 4 is sent from the lighting apparatus 3 to another lighting apparatus 3 in the same group 5, so that entire lighting apparatuses 3 can be controlled based on the detection information detected by the functional plug 4. Therefore, the number of functional plugs 4 can be reduced, resulting in reducing costs.

Further, when two or more functional plugs 4 are attached to lighting apparatuses 3 in each group 5, illumination control of the lighting apparatuses 3 having the functional plugs 4 are controlled based on information detected by respective functional plugs 4, and that of lighting apparatuses 3 with no functional plugs 4 are controlled based on detection information received from any one of the lighting apparatuses 3 having the functional plugs 4.

Moreover, the timer 37 of each lighting apparatus 3 can count the accumulative turn-on time of the lamp 30 and the accumulative turn-on time of the lamp 30 can be reset when the lamp 30 is replaced. Therefore, the accumulative turn-on time of the lamp 30 can be accurately counted for each lighting apparatus. Thus, based on the accurately counted accumulative turn-on time, the luminous flux of the lamp 30 can be maintained to be kept at a constant value despite reduction of the luminous flux due to the characteristic of the lamp with the lapse of time, so that the luminous flux of the lamp 30 can be adjusted to a desired value with high precision.

Further, the control signal sent by the communication unit 32 may include a reset signal of the count of the timer 37. In this case, the timer 37 is easily reset, and is improved in maintenance efficiency.

In addition, although the brightness target value is stored in advance in the memory 34 of each lighting apparatus 3, measuring the brightness to store it in the memory 34 as the brightness target value need not be made for each lighting apparatus 3 when manufacturing the lighting apparatuses 3, wherein the brightness is measured when the lamp 30 is turned on at the illumination rate subjected to the initial illuminance correction in an environment where almost all of the external light is shaded. The brightness may be measured for one lighting apparatus 3, and can be sent to other lighting apparatuses 3 by the communication unit 32 to be stored therein.

Second Embodiment

Components of the illumination control system in accordance with a second embodiment of the present invention are almost identical to those of the first embodiment, and thus will be described with reference to FIG. 1. In the second embodiment, the illumination control system 1 is configured so that at least one lighting apparatus 3, e.g., the lighting apparatus 3A shown in FIG. 6, is set to belong to both of the human detection control group 50 and a brightness detection control group 51 and the brightness detecting plug 41 is attached to the lighting apparatus 3A.

In this embodiment, the lighting apparatuses 3B to 3I have the same configuration as those of the first embodiment, and redundant description thereof will be omitted. That is, illumination levels of the lighting apparatuses 3D and 3E belonging to the brightness detection control group 51 are controlled by the brightness information detected by the brightness detecting plug 41 attached to the lighting apparatus 3E as described in the first embodiment, and illumination level of the lighting apparatus 3A belonging to both the groups 50 and 51 is controlled by the brightness information detected by the brightness detecting plug 41 attached to the lighting apparatus 3A. Further, the lighting apparatus 3A is turned on only when human being is detected by any one of the lighting apparatuses 3B and 3C. In this embodiment, measures are taken to prevent the change in the brightness (illumination levels) of the lighting apparatuses 3 made by the human detection control of the human detection control group 50 from affecting the control operation of the brightness detection control group 51 carried out based on detection of the brightness.

In this embodiment, the control unit 33 of the lighting apparatus 3 belonging only to the human detection control group 50, e.g., the lighting apparatuses 3B and 3C, performs illumination control of the lamp 30 based on human detection information detected by the human detecting plugs 40 and changes the brightness of the lamp 30, e.g., in three steps. More specifically, when a human being is detected by any one of the lighting apparatuses 3B and 3C, the lamp 30 of each of the lighting apparatuses 3B and 3C is turned on first at the illumination rate subject to the initial illuminance correction. The lamp 30 continues to be turned on only for a preset turn-on maintenance time. When the maintenance time has elapsed, the lamp 30 is lit at a illumination rate of, e.g., about 25% of the accumulative illumination rate. Then, the lamp 30 continues to be turned on only for a preset lighting standby time. When the standby time has elapsed, the lamp 30 is turned off.

Figure 6:
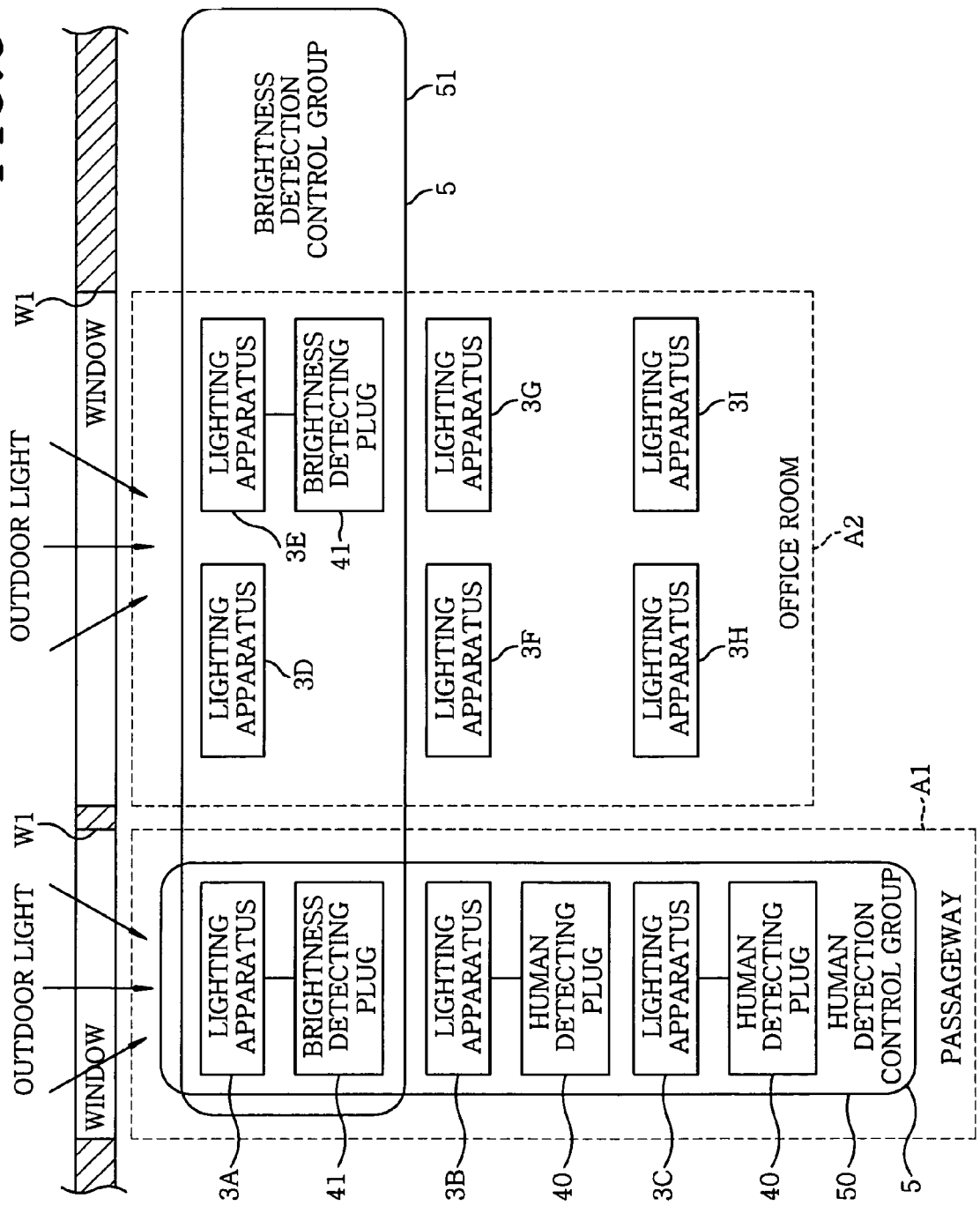
FIG. 6 is a top plan view showing an arrangement example of lighting apparatuses divided into groups in an illumination control system in accordance with a second embodiment of the present invention.
Figure 7:
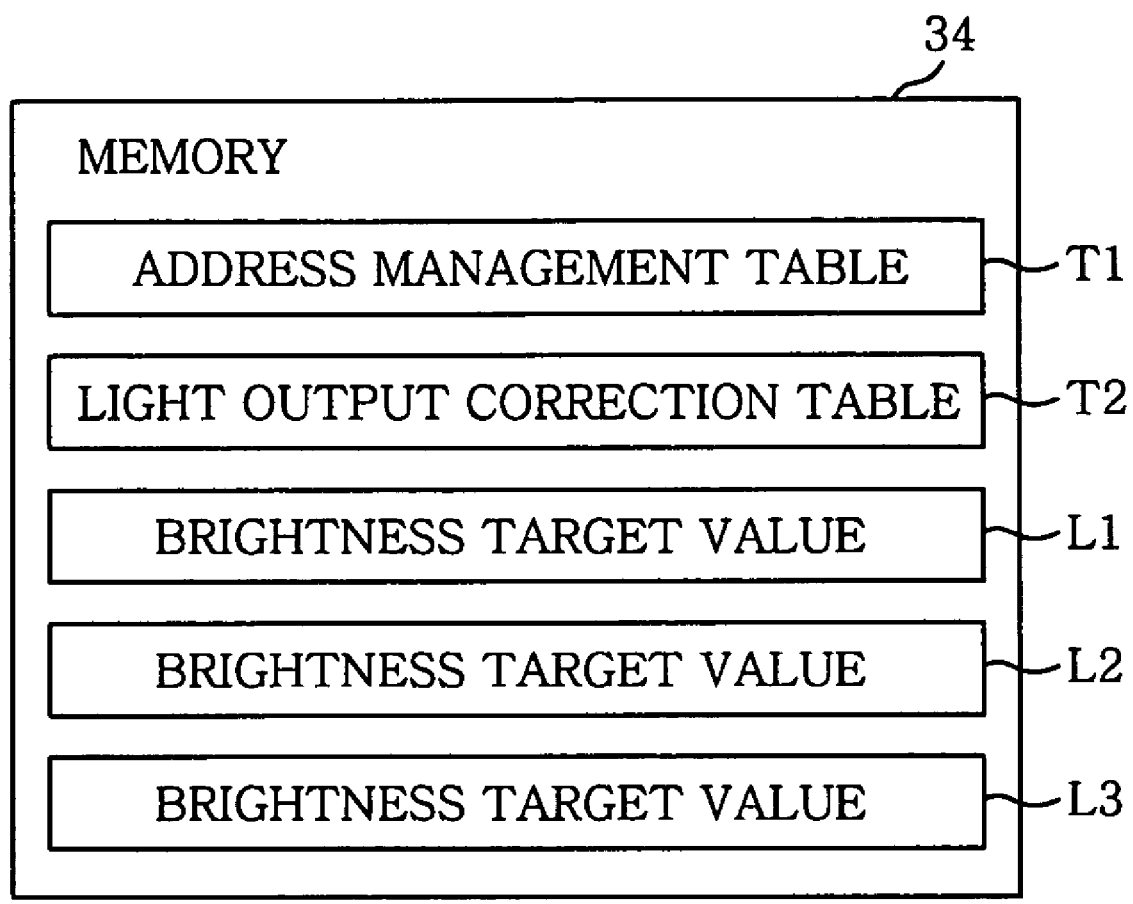
FIG. 7 shows various data stored in a memory of a lighting apparatus.

As shown in FIG. 7, the memory 34 of the lighting apparatus 3 which belongs to the both groups 50 and 51 and also has a brightness detecting plug 41, e.g., the memory 34 of the light apparatus 3A shown in FIG. 6, stores the illumination levels as the brightness target values L1 to L3, wherein the illumination levels are measured when the lamp 30 is turned on at the respective three-step illumination rates subjected to the initial illuminance correction in the environment where almost all of the external light is shaded.

The brightness target values L1 to L3 are target values of the luminous flux, i.e. the brightness, to be detected by the brightness detecting plug 41 of the lighting apparatus 3A in a normal environment under the influence of external light when the illumination rate is controlled in three steps based on the human detection information. The brightness target values L1 to L3 have the relationship L1>L2>L3.

The lighting apparatuses 3 belonging to only in the brightness detection control group 51, e.g., the lighting apparatus 3D or 3E shown in FIG. 6, performs feed-back control of the lamp 30 such that the brightness caused by the irradiating light of the lamp 30 and the external light is matched with the brightness target valve L1 regardless of three step control of the human detection control group 50.

The brightness target values L1 to L3 may be stored in the memory 34 in each of all or a part of the lighting apparatuses 3.

Figure 8:
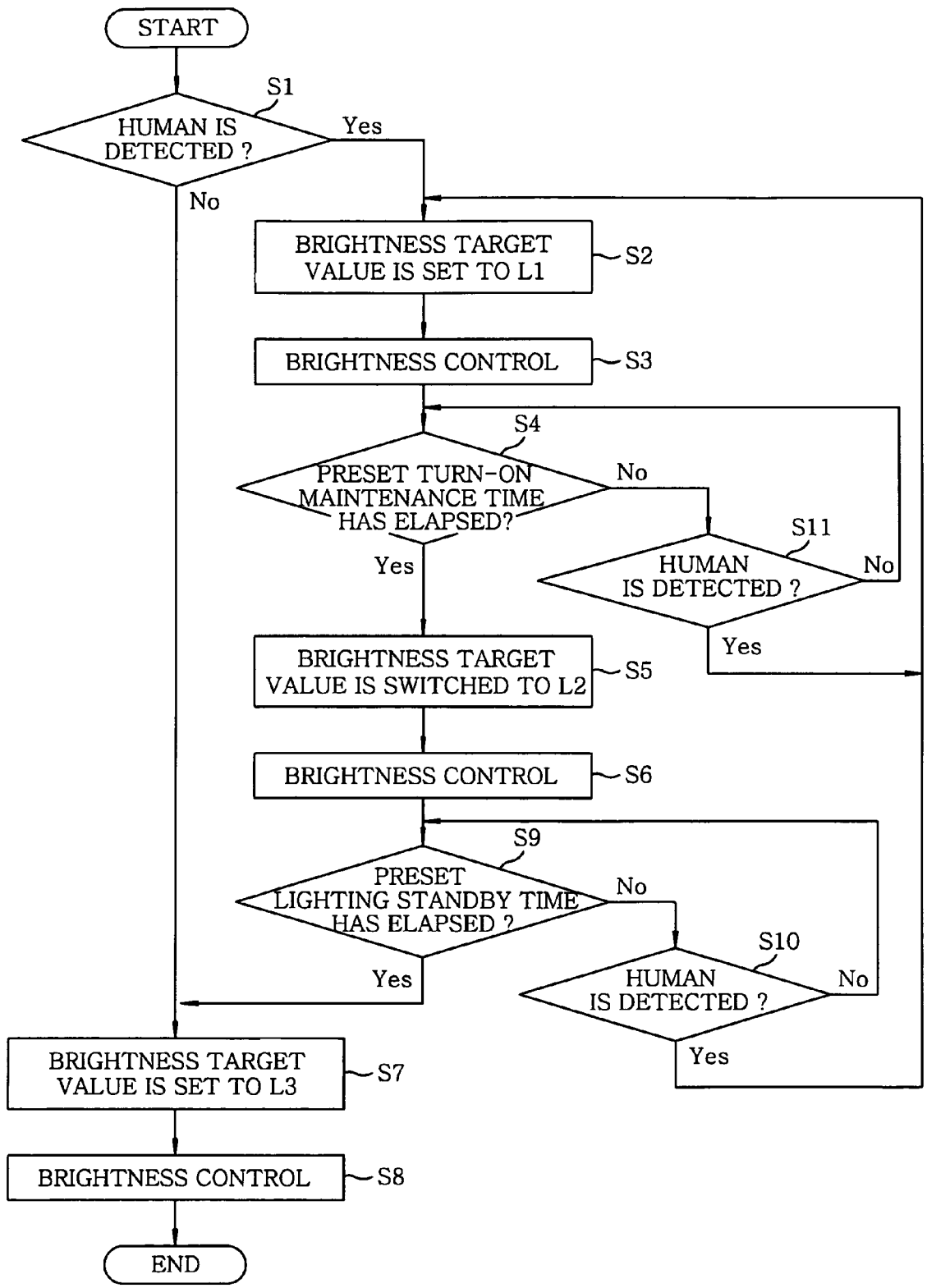
FIG. 8 is a flow chart for illumination control performed by the control unit of a lighting apparatus to which a brightness detecting sensor is attached and which is set in a human detection control group.

FIG. 8 shows an illumination control flow of the lamp 30 performed by the control unit 33 of the lighting apparatus 3A. When a human being is detected by the human detecting plug 40 of any one of the lighting apparatuses 3B and 3C (Yes in step S1), the brightness target value is set to L1 (step S2), and brightness of the lamp 30 is feed-back controlled so as to reflect the value L1 (step S3). A turn-on time for which the lamp 30 is turned on with the brightness is counted by using the timer 37. At step S11, if the human being is detected, the process goes back to step S2; and, if otherwise, the process returns to step S4. If the counted turn-on time is less than the preset turn-on maintenance time, the process goes to step S11 to determine whether a human being is detected by any one of the lighting apparatuses 3B and 3C. When the preset turn-on maintenance time has elapsed without detecting a human being (Yes in step S4), the brightness target value is switched to L2 (step S5). The brightness of the lamp 30 is feed-back controlled so as to reflect the value L2 (step S6).

When no human being is detected by the human detecting plug 40 of one of the lighting apparatuses 3B and 3C (No in step S1), the brightness target value is set to L3 (step S7), and the brightness of the lamp 30 is feed-back controlled so as to reflect the value L3 (step S8). Since the brightness target value L3 is a brightness value of 0, the lamp 30 is turned off.

After the illumination control is performed such that brightness of the lamp 30 is matched with the brightness (illuminance) target value L2, a lighting standby time during which the lamp 30 is turned on with the brightness is counted by using the timer 37. When the preset lighting standby time has elapsed without detecting a human being (Yes in step S9), the process proceeds to step S7, and the brightness target value is switched to L3. When a human being is detected again by the human detecting plug 40 (Yes in step S10), the process returns to S2 while the preset lighting standby time has not yet elapsed (No in step S9). When no human being is detected without the lapse of the preset lighting standby time (No in step S10), the process of S9 is repeated.

In accordance with the present embodiment, a lighting apparatus 3A having a brightness detecting plug 41 can be set to belong to both of the human and the brightness detection control group 50 and 51. When the illumination level is changed by the human detection control, the brightness around the lighting apparatus 3 varies, and the brightness detecting plug 41 detects the changed brightness. The lighting apparatus 3A is controlled based on the detected brightness information. Further, the memory 34 of the lighting apparatus 3A stores the brightness target values L1 to L3 to be detected by the brightness detecting plug 41, the brightness target values L1 to L3 corresponding to the aforementioned illumination levels and the brightness target values L1 to L3 can be switched over according to the illumination level control operation of the human detection control group 50. For this reason, when the lighting apparatus 3A carries out the feedback control on the lamp 30 based on the detected brightness information, errors can be prevented from occurring due to a variation in the brightness around the lighting apparatus 3A caused by the illumination level change of the human detection control. Thus, precise control of the lamp 30 can be made in the brightness detection control group 51.

Further, the present invention is not limited to the configuration of the first and the second embodiment, but it can be variously modified depending on a purpose for which it is used. For example, the communication unit 32 may include a communications circuit using a local area network (LAN) cable as the communications line 2 based on Ethernet standards (registered trademark), or another communications circuit using a wireless LAN cable as the communications line 2 based on wireless LAN standards. Further, the group may include a switch control group in which the lighting apparatuses 3 are turned on or off by manipulating a power supply switch. Also, the control unit 33 may have a communication function for communication with a remote controller for various setups. In addition, the turn-on/off control of the lamp 30 performed by the control unit 33 may be performed by turning on or off a power supply of the illumination circuit 31 using a TRIAC or a relay.

While the invention has been shown and described with respect to the embodiments, it will be understood by those skilled in the art that various changes and modification may be made without departing from the scope of the invention as defined in the following claims.

What is claimed is:

1. An illumination control system comprising:
a plurality of lighting apparatuses connected to a communications line; and
a number of functional units of plural kinds which function to detect information from ambient environments of the lighting apparatuses,
wherein each lighting apparatus includes:
a lamp;
an illumination circuit for continuously or stepwisely changing a luminous flux of the lamp;
a communication unit for sending or receiving a control signal including an operation instruction or a parameter to and from another lighting apparatus through the communications line;
a control unit for controlling the illumination circuit based on the control signal and performing illumination control of the lamp; and
a unit attaching part, wherein the functional units are detachably attached to the unit attaching parts of the lighting apparatus,
wherein each lighting apparatus belongs to one or more of plural groups corresponding to the plural kinds of the functional units, the groups being operated based on information detected by the functional units,
wherein a functional unit having a detecting function corresponding to an operation of each group is attached to each unit attaching part of at least one lighting apparatus of each group, and
wherein each communication unit of the at least one lighting apparatus sends the control signal including information detected by the corresponding functional unit to another lighting apparatus in the same group.

2. The illumination control system of claim 1, wherein the plural groups include: a human detection control group having a lighting apparatus to which a human detecting sensor is attached as a functional unit; and a brightness detection control group having a lighting apparatus to which a brightness sensor is attached as a functional unit,
wherein one or more of lighting apparatuses are set to belong to both the human detection control group and the brightness detection control group, and
wherein each of at least one of the one or more lighting apparatuses belonging to both the human and the brightness detecting control groups has a brightness sensor attached thereto, and stores a plurality of target values of luminous flux, which correspond to illumination levels to be changed by human detection control and are to be detected by the corresponding brightness sensor, so that the target values are switched over according to illumination level control operation of the human detection control group.

3. The illumination control system of claim 1, wherein each lighting apparatus includes a timer which counts an accumulative turn-on time of the lamp, and the control unit of each lighting apparatus performs the illumination control of the lamp based on the accumulative turn-on time of the lamp to maintain the luminous flux at a predetermined value independent of luminous flux reduction due to a characteristic of the lamp with a lapse of time.

4. The illumination control system of claim 2, wherein each lighting apparatus includes a timer which counts an accumulative turn-on time of the lamp, and the control unit of each lighting apparatus performs the illumination control of the lamp based on the accumulative turn-on time of the lamp to maintain the luminous flux at a predetermined value independent of luminous flux reduction due to a characteristic of the lamp with a lapse of time.

* * * * *